United States Patent [19]
Webb

[11] 4,397,532
[45] Aug. 9, 1983

[54] FILM EDITING DEVICE

[76] Inventor: Clarence M. Webb, 505 Orchard Rd., Elizabethton, Tenn. 37643

[21] Appl. No.: 264,418

[22] Filed: May 18, 1981

[51] Int. Cl.$^3$ .................. G03B 21/00; G03B 1/04
[52] U.S. Cl. .................. 352/129; 242/56.8; 242/67.3 R
[58] Field of Search .................. 242/56.8, 56 R, 56.2, 242/67.3 R; 352/122, 129, 130, 92; 353/21, DIG. 2; 40/364, 367

[56] References Cited

U.S. PATENT DOCUMENTS

| | | | |
|---|---|---|---|
| 2,351,399 | 6/1944 | Caracciolo et al. | 352/122 |
| 2,588,087 | 3/1952 | Connor et al. . | |
| 2,591,519 | 4/1952 | Decker . | |
| 2,613,744 | 10/1952 | Hillmer . | |
| 2,783,842 | 3/1957 | Mainardi et al. . | |
| 2,846,159 | 8/1958 | Reynolds . | |
| 2,911,884 | 11/1959 | Caudle et al. . | |
| 3,148,573 | 9/1964 | Bender | 352/130 X |
| 3,161,101 | 12/1964 | Falk . | |
| 3,207,021 | 9/1965 | Bradley . | |
| 3,306,698 | 2/1967 | Mees et al. | 352/122 X |
| 3,441,941 | 4/1969 | Bullwinkel et al. . | |
| 3,492,728 | 2/1970 | Morse . | |
| 3,650,612 | 3/1972 | Malklewicz . | |
| 3,680,805 | 8/1972 | Stewart . | |
| 4,026,644 | 5/1977 | Tsuchida et al. . | |
| 4,211,580 | 7/1980 | Vowles | 352/130 X |

*Primary Examiner*—John M. Jillions
*Attorney, Agent, or Firm*—Luedeka & Neely

[57] ABSTRACT

A film editing device is disclosed for viewing frames of a roll of negative photographic film and marking selected frames for subsequent development. The film editing device includes a film viewing table having an illuminated film viewing window, a film supply spindle is rotatably mounted to the device to one side of the viewing window adapted to receive a roll of negative film, and a film take-up spindle is rotatably mounted to the viewing device to the opposite side of the viewing window upon which the film strip unwinding from the roll of negative film is rewound. The film supply spindle and film take-up spindle are rotatably driven, selectively, by either an electric motor or manually. A film marking device having a plurality of punches is associated with the viewing table to selectively punch holes in the bottom marginal edge of the selected frame of film.

13 Claims, 3 Drawing Figures

FILM EDITING DEVICE

The present invention relates to film editing machines, and more particularly to a film editing machine which enables the selection of a particular frame from a series of frames on a roll of film, and the marking of this selected frame for identification for subsequent development.

In order to speed the process of taking pictures of a large number of different subjects, a photographer uses a roll of film having a large number of frames. This allows the photographer to shoot a large number of subjects without having to stop often to change film. In addition, the use of a roll of film having a great number of frames frees the photographer of the time consuming task of cataloging and otherwise keeping track of many individual rolls of film.

Photographic film having a large number of frames is used to advantage, for example, when taking pictures of students at a school. The use of a roll of film having a large number of frames allows the photographer to continuously take pictures of students without wasting either his time or the time of the students. A typical roll of film for this purpose usually has from 300 to 500 frames or exposures. The photographer will usually take about three frames or exposures of each subject to make sure that there is at least one acceptable exposure.

After taking the photographs, the negative roll of film is later reviewed to select the best exposure of each subject, and the selected exposure is identified so that the proper number of prints in the proper sizes ordered by the subject can be developed.

An object of the present invention is to provide an editing machine which provides for the rapid selection and identification of an exposed frame of each subject to be subsequently developed from a roll of negative photographic film having a large number of exposures of different subjects.

Another object of the present invention is to provide an editing machine which provides for the identification of the number and sizes of prints to be subsequently made of a selected frame from a roll of negative photographic film containing a large number of exposed frames of different subjects.

The present invention provides a film editing device for viewing frames of a roll of negative photographic film and marking selected frames for subsequent development which comprises a film viewing table having a film viewing window, a light source located below the viewing window for illuminating the window and film disposed over the window, a film supply spindle rotatably mounted on the viewing table to one side of the viewing window, a film take-up spindle rotatably mounted on the viewing table to the opposite side of the film viewing window from the film supply spindle, drive means for rotatably driving the film supply spindle and the film take-up spindle selectively in either rotational direction, means for marking the selected frame of film, and means for aligning the selected frame with the marking means.

Other objects and advantages of the present invention will be recognized from the following description and FIGURES in which.

Figure 1:
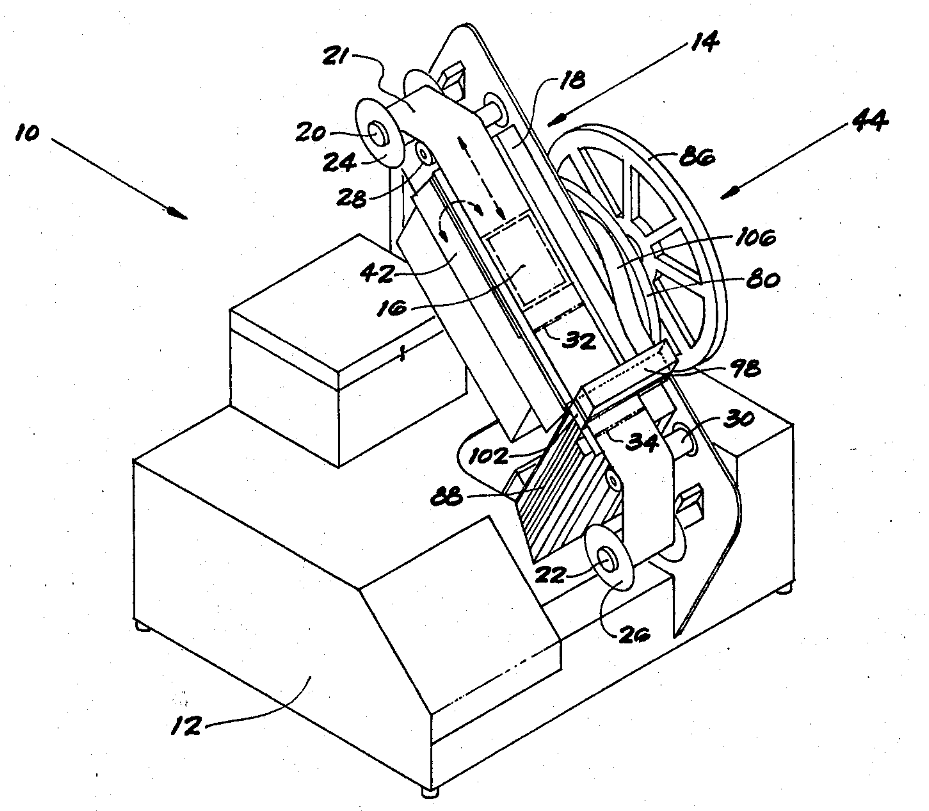
FIG. 1 is a perspective view of a film editing device embodying various features of the present invention.

A film editing device, generally denoted by the numeral 10, is shown as comprising a hollow base 12 having a viewing table 14 mounted thereto at an angle to the horizontal plane for convenient viewing without having to strain.

The viewing table 14 is an elongated, generally rectangularly shaped hollow enclosure having a viewing window 16 formed in a portion of its top surface 18. A film roll supply spindle 20 is rotatably mounted to the viewing table 14 near the elevated end of the table to one side of the viewing window 16 and a film roll take-up spindle 22 is rotatably mounted to the viewing table 14 near the lower end of the table 14 to the other side of the viewing window 16. The rotational axis of the film roll supply spindle 20 and film roll take-up spindle 22 are substantially parallel to each other and transverse to the longitudinal axis of the viewing table 14. A roll 24 of exposed negative film is attached coaxially over the film supply spindle 20 for rotation therewith. A length of film 21 is unwound from the roll of negative film and placed in overlying relationship over the top surface 18 of the viewing table 14. The free end of the film is attached to a film take-up spool 26 attached coaxially over film take-up spindle 22 so that as the film is unwound from the roll of film at the supply spindle 20 it is wound on the take-up spool 26.

Two film tensioning rollers 28 and 30 are rotatably mounted to the viewing table to maintain tension on the film strip 21 overlying the top surface 18 of the viewing table between the supply spindle 20 and take-up spindle 22. One of the tensioning rolls 28 is located near the film supply spindle 20 with its rotational axis parallel to the rotational axis of the supply roll 20 and the other tensioning roll 30 is located near film take-up spindle 22 with its rotational axis parallel to the rotational axis of the film take-up roll 22.

The viewing table 14 is also formed with a first elongated first film alignment slot 32 and a second elongated film alignment slot 34 spaced from and parallel to the first alignment slot. The first and second film alignment slots 32 and 34 are oriented generally transverse to the longitudinal axis of the viewing table 14 and the film strip. The first alignment slot 32 is spaced from the bottom marginal edge of the viewing window 16, and the second alignment slot 34 is spaced to the other side of the first alignment slot 32 from the bottom marginal edge of the viewing window 16. The first alignment slot 32 is used as a film alignment means for, for example 70 mm film and the second alignment slot 34 is used as a film alignment means for film of a different size, for example, 46 mm film, with a film marking means as will hereinafter be explained. The second alignment slot 34 is spaced from the first alignment slot 32 because, not only is the smaller film narrower in width, but because the film frames are also smaller in length. Therefore, the first alignment slot 32 cannot be used to align both larger and smaller film frames. For this reason, the particular frame of film aligned with the second alignment slot 34 will not necessarily be the frame to be marked, but will be another frame spaced from the selected frame to be marked.

Figure 2:
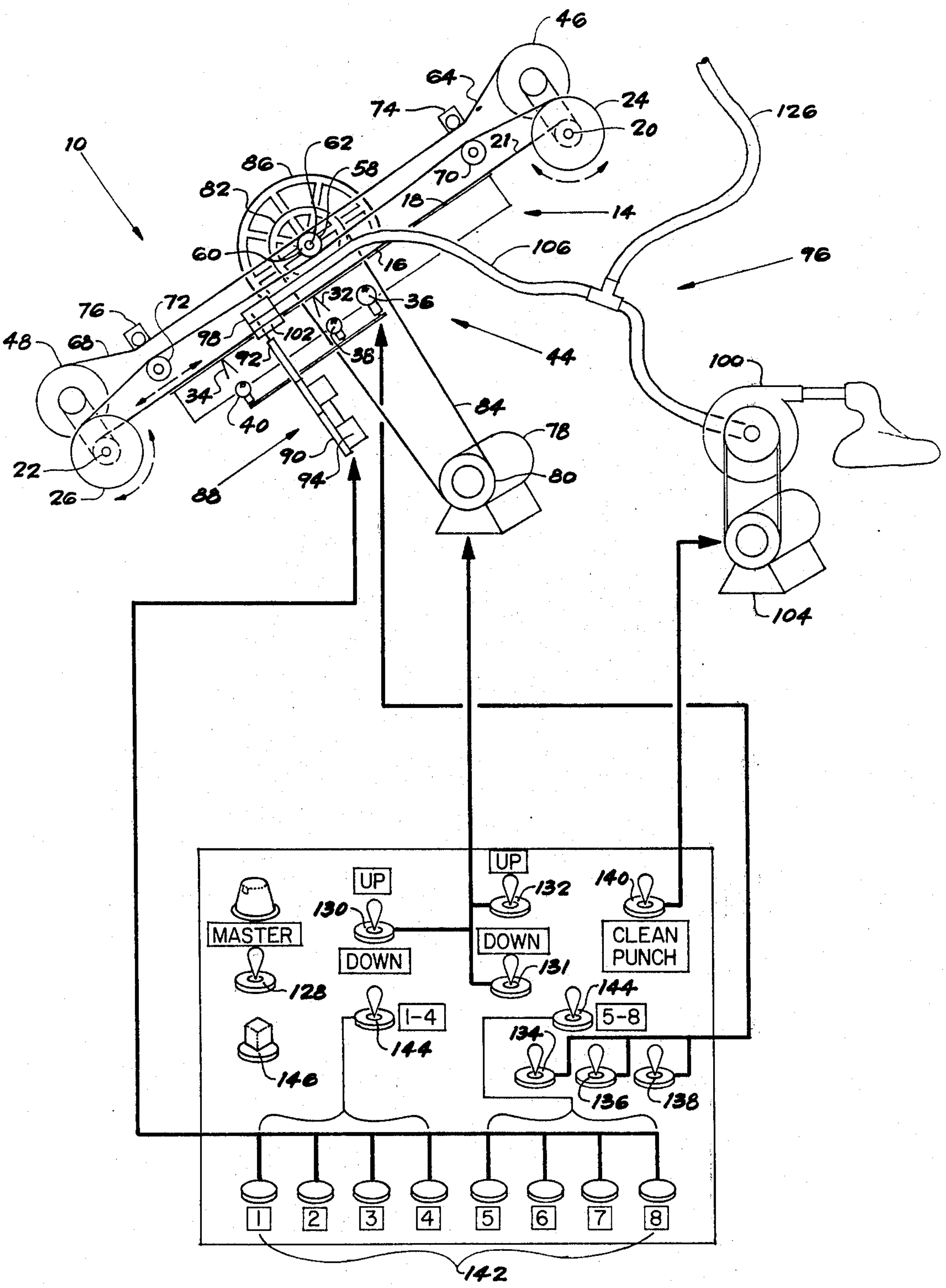
FIG. 2 is a cross-sectional side view of the film editing device of FIG. 1, and a schematic representation of the control panel and circuitry used with the film editing device.

As can be clearly seen in FIG. 2, the viewing window 16, the first alignment slot 32 and the second alignment slot 34 are all illuminated. The light sources for the viewing window 16 and each of the alignment slots 32 and 34 are located within the elongated enclosure of the viewing table 14. These light sources are shown as a first electrical light bulb 36 located below viewing window 16, a second electrical light bulb 38 located below the first film alignment slot 32, and a third electrical light bulb 40 located below the second film alignment slot 34. These electrical light bulbs are connected by appropriate electrical circuitry to control switches so that they are selectively energized. The first light bulb 36 generates sufficient illumination so that images of the exposed negative film are clearly visable and the second and third light bulbs 38 and 40 generate sufficient illumination so that the first and second alignment slots 32 and 34, respectively, are clearly visable through the negative film strip.

An elongated plate 42 is located along one longitudinal side of the viewing table 14 with its longitudinal axis parallel to the longitudinal axis of the viewing table 14. The elongated plate 42 is mounted to the viewing table 14 by a hinge for pivotal movement from a first position overlying the top surface 18 of the viewing table 14 to a second position away from the top surface. The elongated plate 42 has a width equal to the difference between the widths of the two standard size film strips for which the editing device 10 is adapted to edit. For example, if the editing device 10 is adapted for editing both 70 mm and 46 mm film, the elongated plate 42 will be about 24 mm wide.

The film supply spindle 20 and film take-up spindle 22 are selectively rotated in either rotational direction by drive means, generally denoted by the numberal 44. As will hereinafter be explained, the drive means 44 may be selectively operated manually or be power driven. The film supply spindle 20 has an attached supply spindle driven pulley 46 and is rotatably mounted to the viewing table 14 with its axis of rotation parallel to the axis of rotation of the film supply spindle 20, and a take-up spindle driven pulley 48 that is attached to the film take-up spindle 22 and is rotatably mounted to the viewing table 14 with its axis of rotation parallel to the axis of rotation of the film take-up spindle 22. The supply spindle drive pulley 46 is drivingly interconnected with the film supply spindle 20 by a first endless driven belt 64. In a like manner, the take-up spindle drive pulley 48 is drivingly interconnected by a second endless driven belt 68. First and second coaxially disposed intermediate driven pulleys 58 and 60 are rotatably mounted to the viewing table 14 by a common axle 62 mid-way between the supply spindle drive pulley 46 and the take-up spindle drive pulley 48. The rotational axes of the intermediate driven pulleys 58 and 60 are parallel to and in the same plane with the rotational axes of both the supply spindle drive pulley 46 and the take-up spindle drive pulley 48. A first endless drive belt 64 encompasses the supply spindle drive pulley 46 and the first intermediate driven pulley 58 to drivingly interconnect the supply spindle drive pulley 46 and intermediate driven pulley 58. A second endless drive belt 68 encompasses the take-up spindle drive pulley 48 and the second intermediate driven pulley 60 to drivingly interconnect the take-up spindle drive pulley 48 and intermediate driven pulley 60. A first movable drive belt tensioning wheel 70 is mounted to the viewing table 14 adjacent one of the flights of the first endless drive belt 64 between the supply spindle drive pulley 46 and the first intermediate driven pulley 58 with its axis of rotation parallel to the axis of rotation of the supply spindle drive pulley 46. This first tensioning wheel 70 is mounted for both rotational movement and for movement perpendicular to its axis of rotation in a direction toward and away from the adjacent flight of the first endless drive belt 64. A second movable drive belt tensioning wheel 72 is also mounted to the viewing table 14 adjacent one of the flights of the second endless drive belt 68 between the take-up spindle drive pulley 48 and second intermediate driven pulley 60 with its axis of rotation parallel to the axis of rotation of the take-up spindle drive pulley 48. This second tensioning wheel 72 is also mounted for both rotational movement and for movement perpendicular to its axis of its rotation in a direction toward and away from the adjacent flight of the second endless driven belt 68. The first drive belt tensioning wheel 70 is moved perpendicular to its rotational axis into and out of contact with the first endless driven belt 64 by means of a first solenoid 74 operatively connected to the first drive belt tensioning wheel 70, and the second drive belt tensioning wheel 72 is moved perpendicular to its rotational axis into and out of contact with the second endless drive belt 68 by means of a second solenoid 76 operatively connected to the second driven belt tensioning wheel 72. The drive means 44 can be power driven by, for example, an electric motor 78 through a driving pulley 80 attached to the output shaft of the electric motor 78 and a driving pulley 80 coaxially located with the motor 78 and a driven sheave 82 coaxially located with the intermediate driven pulleys 58 and 60 and mounted to the axle 62. The driven sheave 82 and intermediate driven pulleys 58 and 60 are drivingly interconnected to the driving pulley 80 on the output shaft of the electric motor 78 by a third endless belt 84 encompassing the driven sheave 82 and a driving pulley 80. The drive means 44 can be manually operated by a hand wheel 86 which is coaxially mounted with the driven sheave 82 and intermediate drive pulleys 58 and 60 on the axle 62 for rotation therewith.

The selected frame of film is identified by punching a series of holes in the bottom margin of the selected frame. These holes are punched in various sequential patterns which are coded to correspond to the various sized prints and various numbers of prints of each size ordered by a customer. The means for punching the holes in the film is a punch mechanism, generally denoted as the numeral 88, located beneath the viewing table 14 between the viewing window 16 and film take-up spindle 22. The punch mechanism 88 comprises a series of, for example, eight elongated punches 90 spaced apart from each other in a line which is parallel to the first and second film alignment slots 32 and 34, respectively. The longitudinal axis of each of the punches 90 is perpendicular to the plane of the top surface 18 of the viewing table 14 and are mounted for longitudinal reciprocating movement from a location wherein their punching ends 92 are beneath the top surface 18 of the viewing table 14 up-wardly through appropriate apertures formed in the top surface 18 of the viewing table 14 and through the film overlying the top surface 18 of the table. The punches 90 are individually and selectively moved longitudinally upwardly to punch a hole in the film 21 by means of electrical solenoids 94. Each solenoid 94 is operatively associated with a different one of the punches 90. The solenoids 94 are connected by appropriate electrical circuitry to control switches so that they are selectively energized.

The editing device 10 is also provided with vacuum means 96 for conveying punched-out pieces of film away from the viewing table 14 so that these punched out pieces of film will not interfere with the editing and identification process. The vacuum means 96 comprises a vacuum chamber 98 and a vacuum source 100 interconnected to the vacuum chamber 98. The vacuum chamber 98 is open at its bottom 102 and is located over the top surface 18 of the viewing table 18 above the film strip 21 and punches 90 of the punch mechanism 88. The source of vacuum 100 such as, for example, a vacuum pump is in communication with the interior of the vacuum chamber 98 through a hose 106 so that a vacuum is created in the vacuum chamber 98.

Figure 3:
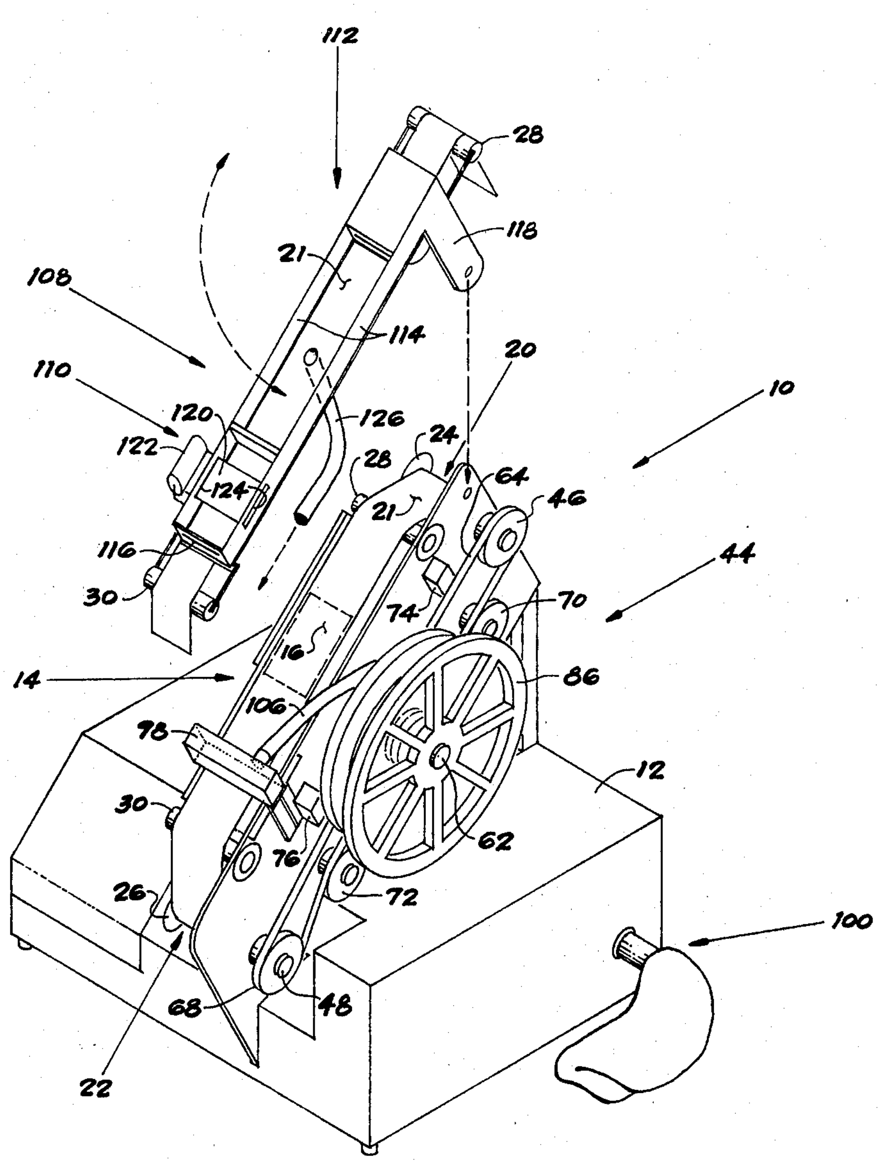
FIG. 3 is another perspective view of the editing device of FIG. 1.

A film cleaning device 108 is illustrated in FIG. 3 and is pivotally mounted to the viewing table 14 for movement between a first position overlying the top surface 18 of the viewing table 14 and a second position remote from the top surface 18 of the viewing table 14. The film cleaning device 108 has a film cleaning station 110 and a film drying station 112. As illustrated, the film cleaning device 108 is formed with longitudinally extending, spaced apart side walls 114 and an end wall 116 interconnecting the side walls 114 at one end thereof. Each side wall 114 is formed with donwardly extending leg 118 at the opposite end from the end wall 116. The free end of each leg 118 is pivotally attached to the viewing table 14 at the elevated end of the viewing table 14, thus, providing the pivotal mounting of the film cleaning device 108 to the viewing table 14. The film cleaning station 110 is located near the end wall 116 and comprises two cloth pads 120 and two rolls 122 of cloth material. The two cloth pads 120 are spaced apart and parallel to each other and are located between the side walls 114 with the space between them extending in the longitudinal direction of the side walls 114. These two pads 120 are to be soaked with a film cleaning solution. The two rolls 122 of cloth material are both rotatably mounted to one side wall outside of the space between the side walls 114. They are mounted one above the other with their axes parallel to each other and parallel to the side wall 114 to which they are mounted so that as a length of cloth is unwound from each roll it will extend transversely across the space between the side walls 114 and between the spaced apart pads 120. Each side wall 114 is formed with a slot 124 providing for the passage therethrough of lengths of cloth unwound from the rolls of cloth 122. The lengths of cloth unwound from the rolls 122 extend in parallel relationship to each other through the slots 124 in the side walls 114 transversely of the space between the side walls 114 and between the spaced apart pads 120. Each length of cloth will be in contact with a different one of the pads 120. The film drying station 112 comprises an enclosure located between the side walls 114 located between the film cleaning station 110 and the film supply spindle 20. The enclosure is open at each of its ends so that the film strip can pass through it as the film is moved between the film supply spindle 20 and film take-up spindle 22. The enclosure is in communication with the vacuum pump 100 through, for example, a hose 126 so that a stream of drying air is drawn through the drying enclosure.

FIG. 2 diagramatically represents an electrical control system for the editing device 10. The electrical control system includes a master switch 128 electrically connecting the control system to a source of electrical energy and for energizing the electric motor 78. A master unwinding and rewinding or up/down switch 130 is provided for selectively energizing either the clockwise or counter-clockwise windings of the electric motor 78. A film unwinding or down switch 131 is electrically connected in the electrical connection between the master up/down switch 130 and the counter-clockwise windings of the electric motor. The down switch 131 is also electrically connected to the second solenoid 76 for moving the second drive belt tensioning wheel 72 against the second endless drive belt 68 encompassing the take-up drive pulley 48 and the second intermediate driven pulley 60. A film rewinding or up switch 132 is electrically connected in the electrical connection between the master up/down switch 130 and the clockwise windings of the electric motor. The up switch 132 is also electrically connected to the first solenoid 74 for moving the first drive belt tensioning wheel 70 against the first endless belt 64 encompassing the supply spindle drive pulley 46 and the first intermediate driven pulley 58. First, second and third electrical light on-off switches 134, 136 and 138, respectively, are included in the electrical control system for selectively energizing the first, second and third light bulbs 36, 38 and 40, respectively. The electrical control system also includes a vacuum on-off switch 140 for selectively energizing the vacuum pump 104 of the vacuum means. Each solenoid 94 for each punch 90 is individually electrically connected in the electrical control system by means of different punch activation switches generally denoted as the numeral 142. The series of punches are divided into, for example, two groups of four each. The punch activation switches 142 of each group of punches are electrically interconnected to a different master punch switch 144 included in the circuitry so that all of the punch activation switches 142 of each group can be electrically de-energized. The electrical control system is protected by an electrical fuse 146.

In operation, the roll 24 of negative film to be edited is mounted on the film supply spindle 20 and a length of film is unwound, laid over the viewing table 14 over the viewing window 16 and attached to a film take-up spool 26 attached to the film take-up spindle 22. The control system is energized by switching the master switch 128 on. If it is desired to manually move the film across the viewing table 14, the master up-down switch 130 is left in the off position and the drive means 44 is manually operated by turning the hand wheel 86. If it is desired to move the film across the viewing table using the electric motor 78, the main film up-down switch 130 is moved to the down position for unwinding the film from the supply spindle 20 or to the up position for rewinding the film back onto the supply spindle 20 from the take-up spindle 22. To effect unwinding of the film from the film roll 24 at the film supply spindle 20 and onto the take-up spool 26 on the take-up spindle 22, the down switch 131 is activated which energizes the second solenoid 76 to move the second tensioning wheel 72 against the second endless drive belt 68 and energizes the counter-clockwise windings of the electric motor 78. To effect rewinding of the film from the take-up spool 26 on the take-up spindle 22 and onto the roll 24 of film, the supply spindle 20, the up switch 132 is activated which energizes the first solenoid 74 to move the first belt tensioning wheel 70 against the first endless drive belt 64 and energizes the clockwise windings of the electric motor 78. If the film to be edited is, for example, 70 mm film, the first light bulb 36 beneath the viewing window 16 is illuminated by turning the first on-off switch 134 to the "on" position, and the second light bulb 38 beneath the first alignment slot 32 is illuminated by turning the second on-off switch 136 to the "on" position. Also, if the film to be edited is 70 mm film the pivoted elongated plate 42 along the edge of the viewing table 14 is pivoted to its second position away from the top surface of the viewing table 14 so that the entire width of film is visible. However, if the film to be edited is 46 mm the second on-off switch 136 is left in the off position and the third on-off switch 138 is moved to the "on" position to illuminate the third light bulb 40 beneath the second alignment slot 34, and the pivoted plate 42 is moved to its first position to cover one longitudinal side of the viewing window 16 so that light showing through the part of the viewing window 16 not covered by the narrower 46 mm film will not interfere with the operator's vision as he views the film. The longitudinal edge of the elongated plate 42 also bears against the longitudinal edge of the narrower 46 mm film to keep the film tracking properly as it moves on the top surface 18 of the viewing table 14. As the film is unwound from the supply roll 24 on the film spindle 20, it moves over the viewing window 16 across the viewing table 14 and is wound on the take-up spool 26 on the take-up spindle 22, and the operator of the editing device observes the film to determine the best photograph of each subject. The film is kept in tension as it moves across the viewing table 14 by the film tensioning rollers 28 and 30. When the operator determines the best frame, he aligns the bottom marginal edge of the selected frame with the first alignment slot 32 if the film is 70 mm, or with the second alignment slot 34 if the film is 46 mm. The operator then activates the master punch switches 144 and activates the individual punch activation switches 142 in a sequence which corresponds to a code denoting various size prints and various numbers of prints to be made upon development of the negative film. The individual punch activation switches 142 each energize a different one of the film punch solenoids 94. When a punch solenoid 94 is energized, it moves its associated punch 90 upwardly and through the bottom marginal edge of the selected frame of film punching a hole through the film. As the punching operation progresses, from time-to-time the operator will activate vacuum "on-off" switch 140 to the "on" position activating the vacuum pump 104 which draws punched-out pieces of film from the vacuum chamber 98 through the hose 106. After the editing process is complete, all of the edited and marked film will be wound on the take-up spool 26 at the take-up spindle 22. Before rewinding the edited and marked film back onto the film supply roll 24 on the film supply spindle 20, the operator moves the film cleaning device 108 to its first position and threads the edited film between the length of unwound cloth from the rolls 122 located between the soaked pads 120 and back onto the film supply roll 24 at the film supply spindle 20. The operator then moves the up switch 132 to the "up" position which activates the electric motor 78 and moves vacuum on-off switch 140 which activates the vacuum pump 104 to draw air through the drying station 112. As the film is wound back onto the supply roll 24, it is drawn through and between the lengths of cloth and is cleaned, and moves through the drying enclosure to remove residual cleaning fluid on the film.

The code relating the punch-out sequence to the print size and number can be worked out to suit ones individual requirements. By way of example, one such code could relate four punchouts to four different standard packages, each package consisting of known different sizes and numbers of prints. These standard packages can be, for the sake of discussion, labeled package A, B, C and D. One punch-out could represent package A, two punch-outs could represent package B, three punch-outs could represent package C, and four punch-outs could represent package D. The other four punch-outs can be coded to denote a number of additional prints and sizes over and above those accounted for in any of the standard packages A, B, C or D. For example, the fifth punch-out could indicate that an additional number of wallet size prints are to be developed in addition to one of the standard packages. The sixth, seventh and eighth punch-outs could likewise indicate, for example, that a different additional number and sizes of prints are to be developed.

The foregoing detailed description is given primarily for clearness of understanding and no unnecessary limitations are to be understood therefrom, for modifications will become obvious to one skilled in the art upon reading this disclosure and may be made without departing from the spirit of the invention and scope of the appended claims.

What is claimed is:

1. A film editing device for viewing frames of a roll of photographic film and marking selected frames for printing, said device comprising:

a film viewing table;

a film viewing window mounted in said film viewing table and being dimensioned to display film of at least first and second sizes;

a film supply disposed on one side of said film viewing window for holding and supplying film to said film viewing window for display thereon;

a film take-up disposed on the other side of said film viewing window from said film supply for receiving and storing film after it has been viewed on said film viewing window;

means for moving the film from said film supply across said film viewing window and to said film take-up;

a first alignment light source disposed on said film viewing table for selectively emitting light, said first alignment light source being positioned for use in aligning a marginal edge of a selected frame of film of the first size in a desired position on said film viewing table; and a second alignment light source disposed on said film viewing table for selectively emitting light, said second alignment light source being positioned for use in aligning a marginal edge of a selected frame of film of the second size in a desired position on said film viewing table.

2. The device of claim 1, further comprising cleaning means adapted to clean the edited film as the film is being rewound on said film supply spindle from said film take-up spindle, said cleaning means being pivotally mounted on the device for movement between a storage position where it is disposed distally from said film viewing window and an in-use position where it is disposed adjacent to said film viewing window and generally between said film supply and said film take-up.

3. The device of claim 1 wherein said first and second alignment light sources comprise:

a first light emitting slot formed in said film viewing table for use with film of the first size;

means for selectively illuminating said first light emitting slot;

a second light emitting slot formed in said film viewing table for use with film of the second size; and means for selectively illuminating said second light emitting slot.

4. The device of claim 1 further comprising means for selectively covering a portion of said film viewing window when said device is being used to display film of the smaller of the first and second film sizes.

5. The device of claim 1 further comprising:

an elongated plate;

means for mounting said elongated plate on said film viewing table in a position partially covering said film viewing window; and said elongated plate being dimensioned to cover, when mounted on said film viewing table, a portion of said film viewing window having a width equal to the difference in width between the first and second film sizes so that said plate may be mounted on said film viewing table to reduce the width of said film viewing window to accommodate the smaller film of the first and second film sizes.

6. The device of claim 5 wherein said means for mounting comprises a hinge for rotatably mounting said elongated plate for rotation between a position partially covering said film viewing window and a position rotated away from and uncovering said film viewing window.

7. The device of claim 1 further comprising means for marking a marginal edge of a selected frame of film.

8. The device of claim 7, wherein said means for marking the selected film frame comprises:

a plurality of spaced apart punches disposed between said film supply spindle and said film take-up spindle; and, means for activating selected punches for selectively punching holes in the bottom marginal edge of the selected frame.

9. The device of claim 8, wherein said means for activating selected punches comprises:

a different electrical solenoid operatively associated with each of said punches;

means for selectively electrically energizing each of said electrical solenoids;

electrical circuitry operatively interconnecting said electrical solenoids and said means for energizing said solenoids.

10. The device of claim 8, further comprising:

a vacuum chamber disposed at the location of said film punches;

vacuum creating means; and, means operatively interconnecting said vacuum chamber and said vacuum creating means to create a vacuum in said vacuum chamber;

whereby, pieces of film punched out by said punches are conveyed away from said film.

11. The device of claim 7, wherein said marking means marks the bottom marginal edge of the selected frame.

12. The device of claim 8, wherein said plurality of spaced apart punches are disposed transversely of the movement of the film.

13. The device of claim 1 wherein said film supply, film take-up and means for moving comprise:

a film supply spindle having an axis of rotation;

a film take-up spindle having an axis of rotation parallel to the axis of rotation of said film supply spindle;

a supply spindle pulley attached to rotate said supply spindle and having a axis of rotation;

a take-up spindle pulley attached to rotate said take-up spindle and having an axis of rotation parallel to the axis of rotation of said supply spindle pulley;

first and second co-axial pulleys connected for simultaneous rotation in unison;

a supply belt means connected between said first co-axial pulley and said supply spindle pulley for transferring rotational forces therebetween;

a take-up belt means connected between said second co-axial pulley and said take-up spindle pulley for transferring rotational forces therebetween;

an external input pulley attached to rotate said first and second co-axial pulleys, said external input pulley being adapted for being attached to an external drive source to drive said film supply spindle and said film take-up spindle; and a hand wheel attached to rotate said first and second co-axial pulleys for being rotated by hand to drive said film supply spindle and said film take-up spindle.

* * * * *